US012619766B2

(12) United States Patent
Chirputkar

(10) Patent No.: US 12,619,766 B2
(45) Date of Patent: May 5, 2026

(54) SYSTEM AND METHOD FOR CONFIDENTIAL DATA IDENTIFICATION WITH QUANTITATIVE RISK ANALYSIS IN NETWORKS

(71) Applicant: Shirish Dattatraya Chirputkar, Pune (IN)

(72) Inventor: Shirish Dattatraya Chirputkar, Pune (IN)

( * ) Notice: Subject to any disclaimer, the term of this patent is extended or adjusted under 35 U.S.C. 154(b) by 188 days.

(21) Appl. No.: 18/004,303

(22) PCT Filed: May 14, 2021

(86) PCT No.: PCT/IN2021/050460
§ 371 (c)(1),
(2) Date: Jan. 5, 2023

(87) PCT Pub. No.: WO2022/137248
PCT Pub. Date: Jun. 30, 2022

(65) Prior Publication Data
US 2023/0252184 A1 Aug. 10, 2023

(51) Int. Cl.
*G06F 21/62* (2013.01)
*G06F 16/951* (2019.01)

(52) U.S. Cl.
CPC ........ *G06F 21/6245* (2013.01); *G06F 16/951* (2019.01)

(58) Field of Classification Search
None
See application file for complete search history.

(56) References Cited

U.S. PATENT DOCUMENTS

| | | | |
|---|---|---|---|
| 8,407,194 B1 * | 3/2013 | Chaput ................. | G06F 21/552 |
| | | | 707/694 |
| 9,262,727 B2 | 2/2016 | Broussard et al. | |
| 10,482,396 B2 | 11/2019 | Dick et al. | |
| 11,238,176 B1 * | 2/2022 | Vax ..................... | G06F 16/2457 |

(Continued)

OTHER PUBLICATIONS

International Search Report and Written Opinion for related International Application No. PCT/IN2021/050460 mailed Sep. 20, 2021.

*Primary Examiner* — Christopher C Harris
(74) *Attorney, Agent, or Firm* — Renner, Otto, Boisselle & Sklar, LLP

(57) ABSTRACT

Present invention relates to systems and methods for calculation of information and cyber risk posed by the systems and methods that process data and their automated non-compliance verification and information and cyber risk posed by non-compliance. Disclosed is a system (100) and a method (200) for calculation of information and cyber risk by identifying sensitive electronic information stored in client devices (10) like desktops, laptops, mobile devices and databases of shared network drives or cloud environments connected through a communication network (20). The system (100) is capable of identifying the data at rest stored in various file formats such as word, excels, csv, pdf, power point, database file formats and compressed file formats. The method (200) calculates information and cyber risk and there identifies the potential liability or insurance value based on volume and value of data and compliance with corporate policies for data protection and potential areas of non-compliance.

10 Claims, 5 Drawing Sheets

(56)     References Cited

U.S. PATENT DOCUMENTS

| | | | |
|---|---|---|---|
| 2005/0131828 | A1 | 6/2005 | Gearhart |
| 2007/0180258 | A1 | 8/2007 | Broussard et al. |
| 2009/0265199 | A1 | 10/2009 | Moerdler et al. |
| 2012/0004945 | A1 | 1/2012 | Vaswani |
| 2020/0050966 | A1* | 2/2020 | Enuka .................... G06Q 10/10 |
| 2021/0056601 | A1* | 2/2021 | Barday ............. G06Q 30/0609 |
| 2023/0385451 | A1* | 11/2023 | Lockhart, III ...... G06F 21/6245 |

* cited by examiner

60

100

200

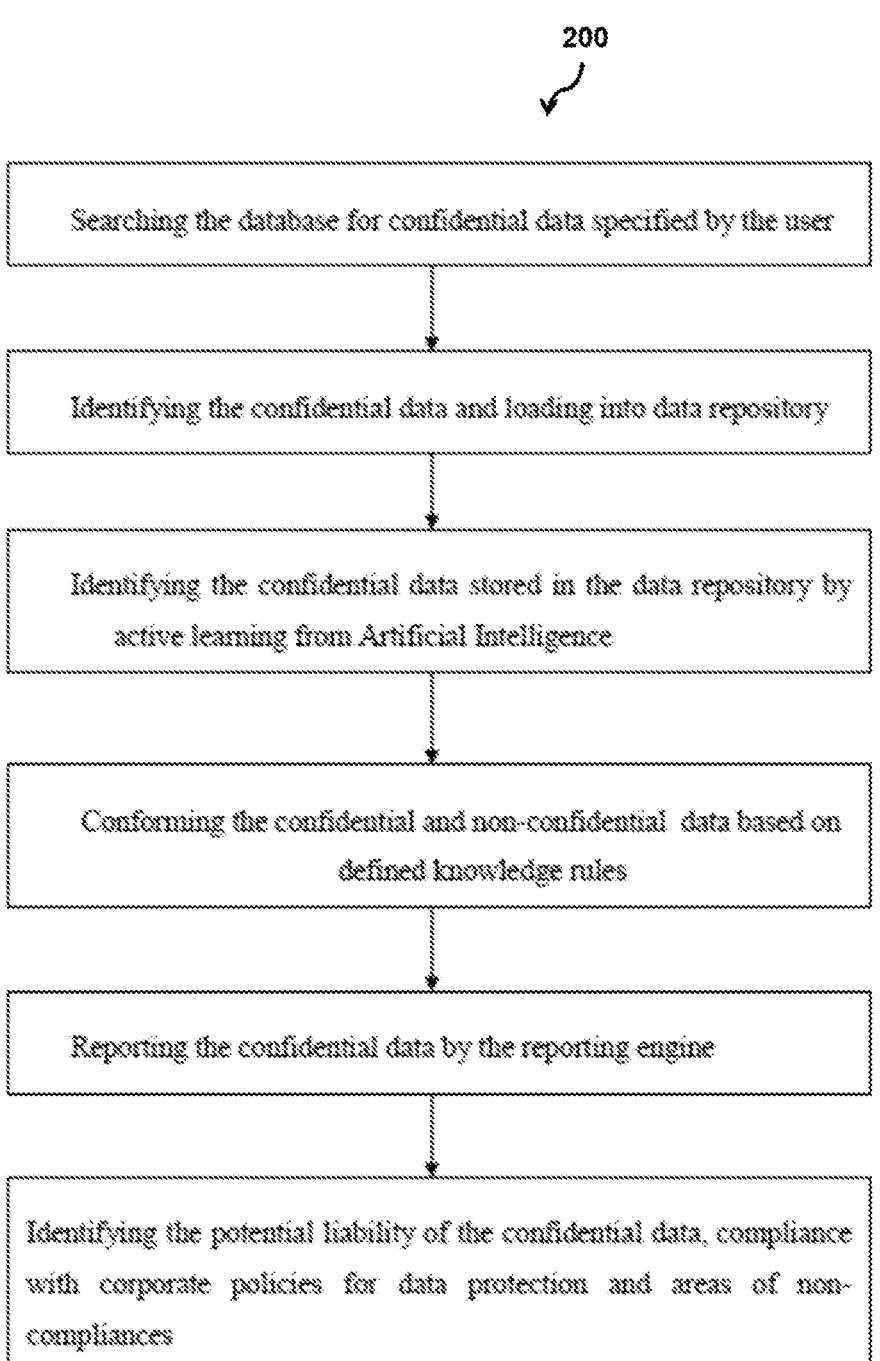

Searching the database for confidential data specified by the user

Identifying the confidential data and loading into data repository

Identifying the confidential data stored in the data repository by active learning from Artificial Intelligence Conforming the confidential and non-confidential data based on defined knowledge rules Reporting the confidential data by the reporting engine Identifying the potential liability of the confidential data, compliance with corporate policies for data protection and areas of non-compliances

Figure 6

SYSTEM AND METHOD FOR CONFIDENTIAL DATA IDENTIFICATION WITH QUANTITATIVE RISK ANALYSIS IN NETWORKS

This application is a national phase of International Application No. PCT/IN2021/050460 filed May 14, 2021, which claims priority to India application No. 202021056477 filed Dec. 25, 2020, the entire disclosures of which are hereby incorporated by reference.

FIELD OF INVENTION

The present invention relates to system and method for confidential data identification with quantitative risk analysis in networks and more particularly relates to the system and the method for quantitatively determining and presenting private-confidential and business-confidential data identifiers to produce critical cyber, financial, public relations, business continuity and other risk metrics that organizations may be legally liable for in a novel and streamlined way.

BACKGROUND OF THE INVENTION

Computer networks have become a significant and vital part of day to day life. Accordingly, machines connected to such networks have become primary tools for storing various types of private and/or confidential personal and business information. Said information, including proprietary, confidential, or other sensitive data becomes at risk as its dissemination increases. This, in turn, increases the necessity of securing said data and therefore enterprises and other organizations have come to rely on numerous disparate tools and time consuming and inefficient processes in an attempt to keep intruders and unauthorized personnel from accessing said information.

According to the US Securities and Exchange Commission (https://www.sec.gov/about/privacy/piaguide.pdf) and Federal Trade Commission (https://www.ftc.gov/site-information/privacy-policy/privacy-impact-assessments) the organizations of all sizes need an intelligent, private, data discovery solution to appropriately quantify information and cyber risk so that data governance and its compliance can be implemented. Said organizations are typically ill-equipped to sufficiently quantify information or cyber risk posed by the data at rest and in transit on their networks performed on a periodic basis that requires protection commensurate with various US and European regulations such as NYSDFS (New York State Department of Financial Services), GDPR (European General Data Protection Regulation), GLBA (Gramm Leach Bliley Act), PCI (Payment Card Information) and PHI (Personal Health Information), and like. As a result, any insufficient protections may expose said organizations to various liabilities including those due to regulatory non-compliance.

A prior art patent application US20120004945A1 relates to a computerized system and method for collecting, analyzing, and reporting governance, risk, and compliance information relating to an organization. The method includes specifying a target for scanning, establishing a communication link with the specified target, identifying technical data within the specified target, receiving the identified technical data, parsing the technical data into one or more lexical units, selecting a regulatory map against which the one or more lexical units are evaluated, determining whether one or more lexical units is in compliance with the selected regulatory map, and providing the results of the determining step to a user.

Another prior art patent application US20090265199A1 discloses a method for governance, risk, and compliance management which includes providing an interface for defining a control to be used to reach a goal of an organization. The control provides a procedure to be followed by the organization. The method further includes providing the interface for defining a metric for tracking progress of the organization towards reaching the goal using the procedure. The method further includes receiving metric data from an external source. The metric data corresponds to the metric. The method further includes tracking the progress of the organization towards reaching the goal using at least the metric and the metric data and displaying the progress of the organization towards reaching the goal.

One more prior art patent U.S. Pat. No. 9,262,727B2 is directed to a system and method for searching a computing device for confidential content and reporting back any policy violations.

Yet another prior art patent U.S. Pat. No. 10,482,396B2 relates to system and method for automated compliance verification. In particular, a compliance computer creates and sends a transmission object, which contains data referencing the rules contained in the compliance documents, to an operator server. The operator server searches for updates to the rules referenced in the transmission object and informs the entity if any updates are found. The transmission object may also reference jurisdictions and topics associated with the entity's operations, in which case the operator server uses that data to identify rules and/or updates to rules applicable to the entity's operations. The entity may then use the information from the operator server to update its compliance documents.

Hence, currently, there are various commercial off the shelf products that can identify data at rest in pockets such as the data on file and print servers. However, a comprehensive source of identification of data and its information and cyber risk impact to the enterprise is not defined. None of the prior art mentioned above disclose about quantifying the information risk and calculating the value of the confidential and private data.

Accordingly, there exists a variety of needs to provide a system that can identify and analyze confidential data for quantitative risk in communication networks and can overcome the drawbacks of prior art techniques.

OBJECTS OF THE INVENTION

An object of the present invention is to analyze and identify all the data at rest at various end points of communication networks to best determine and present discovered risks for personal, small-medium and enterprise-wide networks and devices.

Another object of the present invention is to calculate information and cyber risk and the potential liability associated with said data at rest and business confidential data.

Another object of the present invention is to identify gaps associated with protection of private and confidential data.

SUMMARY OF THE INVENTION

Accordingly, in one aspect, the present invention provides a system for calculation of information and cyber risk by identifying private-confidential and business-confidential data and by calculating quantitative risk analysis in enterprise (organization) networks. The system comprises a plurality of client devices, a communication network and a communication unit. Each client device has an input device, an output device, memory, a processor with a plurality of applications configured thereon. The communication unit communicates with each client device through the communication network. The communication unit comprises a memory unit, a processor for processing instructions stored in the memory unit, an input unit, an output unit, a crawler module, a data repository, an artificial intelligence module and a reporting module.

In another aspect, the present invention provides a method for calculation of information and cyber risk by confidential data identification and quantitative risk analysis in enterprise (organization) networks. The method is described in conjunction with the system. The crawler module has a set of instructions for scanning and searching confidential data including PII (personally identifiable information), PHI (personal/protected health information), PCI (payment card industry), business confidential data and customized general data stored at each client device in multiple file formats including plain text file formats, compressed file formats, raster/image file formats and customized file formats. The data repository stores the confidential data received from the crawler module. The artificial intelligence module analyses the confidential data stored in the data repository and categorizes the confidential data into data classes such as PII, PHI, PCI and customized general data. The artificial intelligence module performs quantitative risk analysis of the identified confidential data and provides potential liability or insurance value based on predefined parameters and volume and value of data. The reporting module reports categorized confidential data on the output unit. The method quantifies information and cyber risk and which can be used to assess potential liability and/or insurance value based on volume and value of data and compliance with corporate policies for data protection and potential areas of non-compliance.

BRIEF DESCRIPTION OF THE DRAWINGS

The objects and advantages of the present invention will become apparent when the disclosure is read in conjunction with the following figures, wherein

FIG. 6 shows a flow diagram of method for confidential data identification with quantitative risk analysis in networks in accordance with the present invention.

DETAILED DESCRIPTION OF THE PRESENT INVENTION

Figure 1:
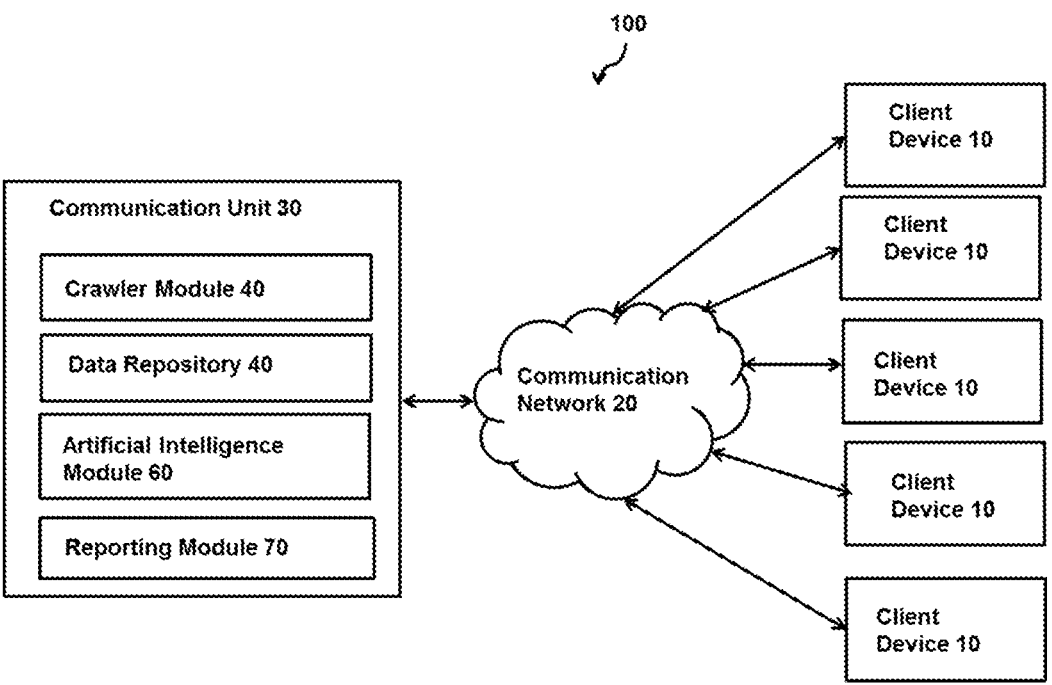
FIG. 1 shows a block representation of a system for confidential data identification with quantitative risk analysis in networks in accordance with the present invention.

The foregoing objects of the present invention are accomplished and the problems and shortcomings associated with the prior art, techniques and approaches are overcome by the present invention as described below in the preferred embodiments.

The present invention provides system and method for quantifying information and cyber risk by identifying sensitive electronic information stored in various end points including desktops, laptops, mobile devices and databases of shared network drives or cloud environments. The system is capable of identifying the data at rest stored in various document file formats such as word, excel, csv, pdf, power point, database file formats, and compressed file formats such as rar, 7z, and zip, etc.

The present invention is illustrated with reference to the accompanying drawings, throughout which reference numbers indicate corresponding parts in the various figures. These reference numbers are shown in bracket in the following description and as well as in following table 1.

TABLE 1

| Reference No. | Types of Components |
| --- | --- |
| 10 | client devices |
| 20 | communication network |
| 30 | communication unit |
| 40 | crawler module |
| 50 | data repository |
| 60 | artificial intelligence module |
| 70 | reporting module |
| 100 | system for confidential data identification with quantitative risk analysis |
| 200 | method of confidential data identification with quantitative risk analysis |

Referring to the FIGS. 1 to 6, a system for confidential data identification with quantitative risk analysis (100) (herein after referred to as "the system (100)") in networks, in accordance with the present invention is shown. In an embodiment, the networks includes personal, small-medium and enterprise-wide networks and devices and like, but not limited thereto. The system (100) comprises a plurality of client devices (10), a communication network (20) and a communication unit (30).

FIG. 1 depicts a pictorial representation of a network of data processing systems in which the present invention is implemented. FIG. 1 is intended as an example, and not as an architectural limitation for the present invention.

Each client device (10) has an input device (not shown), an output device (not shown), memory (not shown) and a processor (not shown) with a plurality of applications configured thereon. Each client device (10) is operably connected to communication network (20). The client devices (10) are various locations across the communication network (20) where the confidential data is stored at rest. In the embodiment, the end points (10) can be selected from personal computers, network computers, desktops, laptops, databases, mobile devices, cloud environments, shared network and printer drives and like, but not limited thereto.

The communication network (20) is used to provide communications links between various devices and computers connected together within the system (100). The communication network (20) includes connections, such as wire, wireless communication links, or fiber optics. In an exemplary embodiment, the communication network (20) is described as a private network that is directly controlled by a user either directly or through vendors. The communication network (20) provides cloud services to the client devices (10).

The communication unit (30) is connected to the communication network (20). The communication unit (30) provides data, such as boot files, operating system images, and applications to each client device (10). The client devices (10) are clients to the communication unit (30). In an exemplary embodiment, the communication unit (30) is a server. The system (100) may include additional servers, clients, and other devices that are not shown for simplicity.

The communication unit (30) includes a memory unit (not shown), a processor unit (not shown), an input unit (not shown), an output unit (not shown), a crawler module (40), a data repository (50) an artificial intelligence module (60) and a reporting module (70). The memory unit stores a plurality of processing instructions for an operation of the communication unit (30). The processor unit communicates with the memory unit. The processor is configured to issue the plurality of processing instructions stored in the memory unit. The input unit is operable connected for providing inputs to the communication unit (30). The input units may include a keyboard, a mouse, a camera, a biometric scanner, a microphone and like but not limited thereto. The output unit provides output of the communication unit (30). The output unit may include a display, a speaker and like, but not limited thereto.

The crawler module (40) has a set of instructions for scanning and searching confidential data stored at each client device (10) in multiple file formats. The confidential data may include PII (personally identifiable information) data, PHI (personal/protected health information) data, PCI (payment card industry) data, business confidential data and customized general data, but not limited thereto. In the embodiment, the PII data includes first name, last name, address, phone number and like. The PHI data includes medical records, biometric data, license information, and like. The PCI data includes primary account number, cardholder name, expiration date for the card, and like. The multiple file formats include plain text file formats, compressed file formats, raster/image file formats and customized file formats. The generic fields are also available to carry out the searches.

The crawler module having a set of instructions to gaze across the network (20) and search for the confidential data including PII (Personally Identifiable Information), PHI (personal health information), PCI (Payment Card Information) or any other business confidential data belong to the user. The generic fields are also available to carry out the searches. An end point location extractor (not numbered) is coupled to the crawler module (40) for providing location and configuration of the plurality of the client devices (10).

The confidential data identified by the crawler module (40) are loaded/stored into the data repository (50). Specifically, the data repository (50) is a SQL Database. In an alternative embodiment, the data repository is a No SQL Database or a Key value pair database and like.

The artificial intelligence module (60) is capable of defining and managing a set of rules. The artificial intelligence module (60) is also capable of actively learning from the data and recommending new rules. The artificial intelligence module (60) analyses the confidential data stored in the data repository (50) and categorizes the confidential data into data classes such PII, PHI, PCI and or any type of business confidential data specified by the enterprise. Non-confidential data is considered as data that is publicly available and is not covered by any regulations or the data is classified by the enterprise as public. The artificial intelligence module (60) performs quantitative risk analysis of the identified confidential data and provides potential liability or insurance value based on volume and value of data and predefined parameters.

The identified PII, PCI, PHI or confidential data are reported by the reporting module (70) for potential liability or non-compliance with corporate policies.

Again referring to the figures from 1 and 6, a method of confidential data identification with quantitative risk analysis (200) (herein after referred to as "the method (200)") in the networks in accordance with the present invention is described. In the embodiment, the networks includes personal, small-medium and enterprise-wide networks and devices and like, but not limited thereto. The method (200) is described in conjunction with the system (100).

Figure 2:
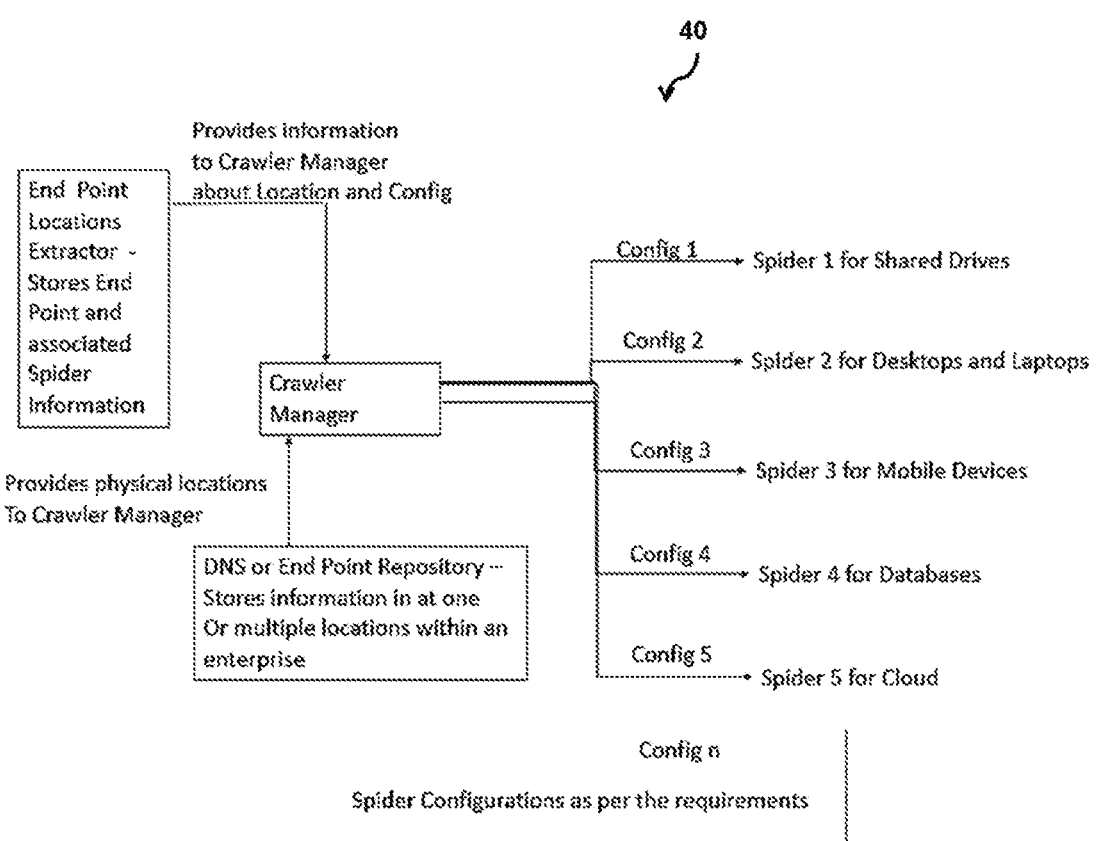
FIG. 2 shows a functional flow diagram of a crawler module of the system of the FIG. 1.
Figure 3:
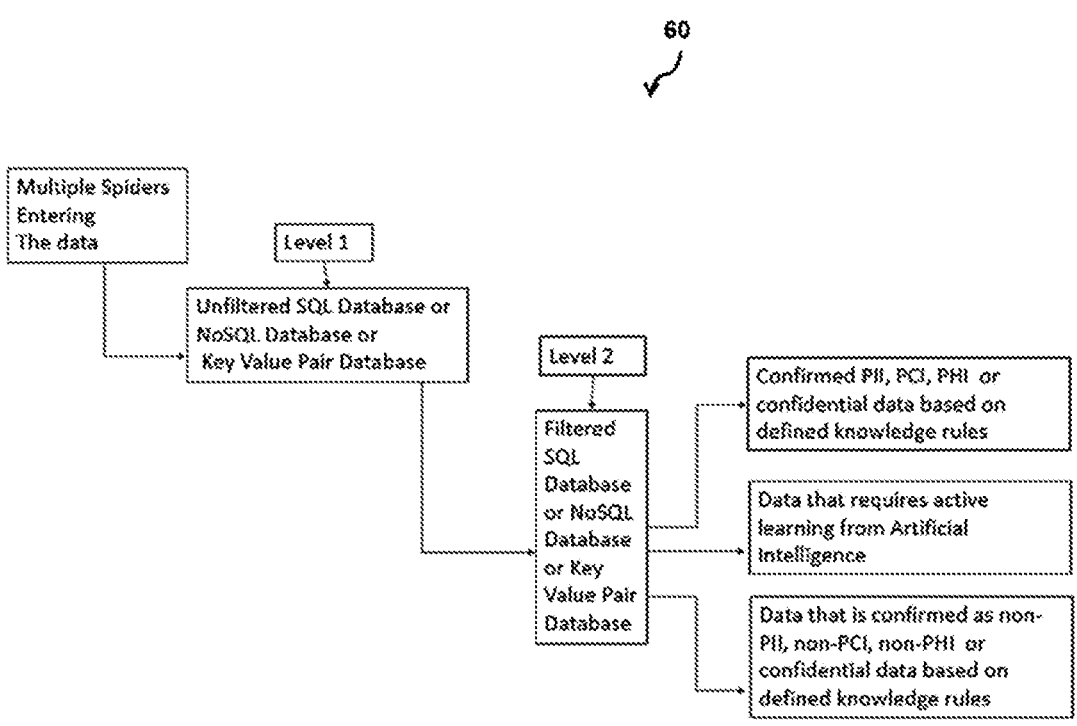
FIG. 3 shows a functional flow diagram of an artificial intelligence module of the system of the FIG. 1.
Figure 4:
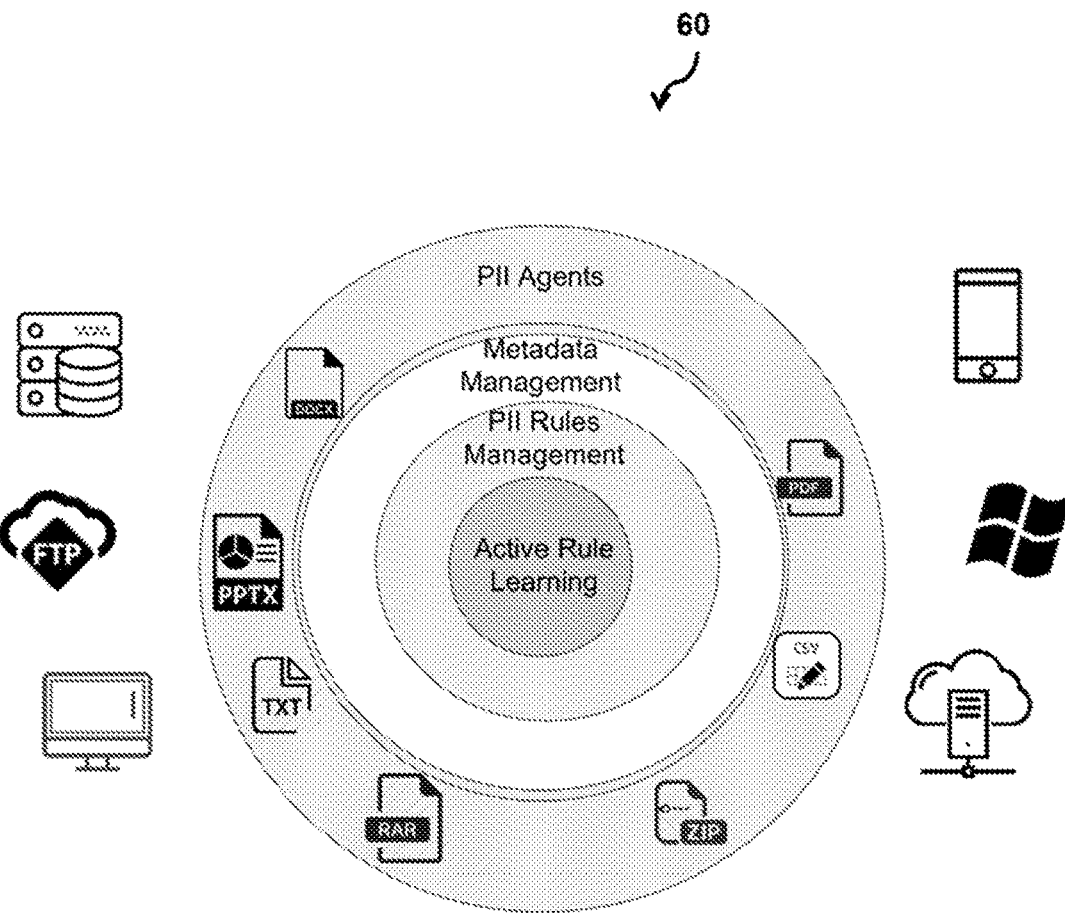
FIG. 4 shows a schematic of the artificial intelligence engine module of the system of the FIG. 1.
Figure 5:
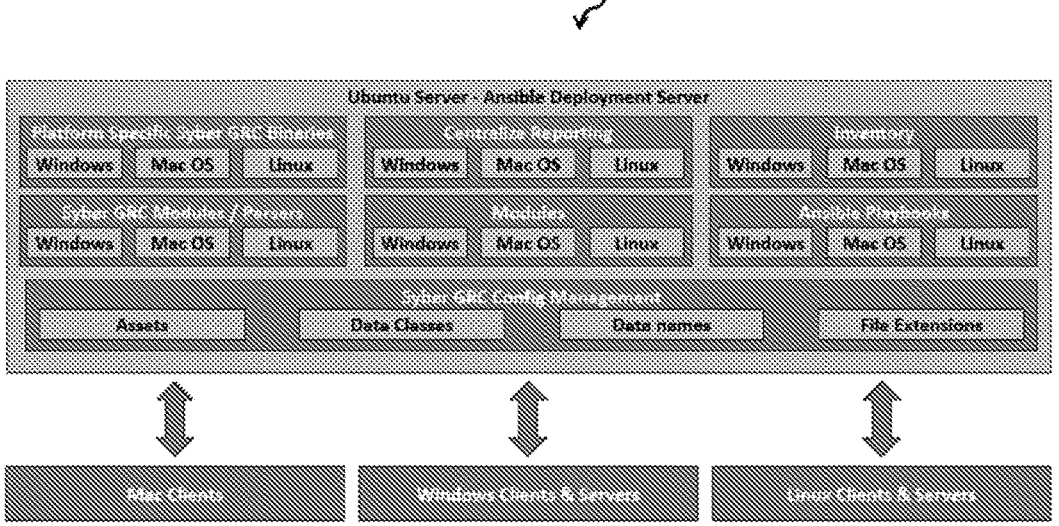
FIG. 5 illustrates exemplary deployment architecture of the system of the FIG. 1.

In the first step, the crawler module (40) looks across the communication network (20) and search for PII, PHI, PCI or any type of confidential data specified by the user/enterprise stored at rest on each client device (10). Generic fields are also available for the searches. The data identified by the crawler module (40) is further stored into the data repository (50). A design of the crawler module (40) that carries out searches in the enterprise or corporate network at various client devices (10) is shown in FIG. 2.

Thereafter the artificial intelligence module (60) performs active learning on the confidential data stored in the data repository (50). The artificial intelligence module (60) confirms confidential and non-confidential data in the data repository (50) and is identified as PII, PHI, PCI or any type of confidential data specified by user. The confirmation of the confidential data is done by the artificial intelligence module (60) based on a set of knowledge rules. In a specific embodiment, files and folders are grouped into data classifications such as public, internal, confidential and restricted. The artificial intelligence module (60) compares the existing permissions on files and folders. If there is a public permission on the confidential files and folders, then those files and folders are marked at high risk.

Following are the four critical functions of the artificial intelligence module (50):

a) Define Rules—Generic rules are defined to identify fields specified by various regulations. Additional rules can be defined as per the user specifications to identify confidential data. For example, account numbers.

b) Rules Management and Monitoring—The method of operations is managed by active monitoring service.

c) Active Learning from Rules—The method is actively learning from metadata identified in PII, PHI, PCI, regulatory data, and business confidential and will actively learn to identify additional related data on the network.

d) Rules Recommendation—Wherever needed, the system will recommend to new rules or modification to existing rules based on the learning from the metadata.

Further, the identified PII/PCI/PHI/confidential data are reported by the reporting module (70) for potential liability or non-compliance with corporate policies.

In an exemplary embodiment, the following Table 2 shows an exemplary output of the reporting module (70) of the system (100).

TABLE 2

| Sr. No. | Location of data | No. of Records | Type of Data | Value of Data | Compliance Factor |
|---|---|---|---|---|---|
| 1 | W Drive | 1000 | PII | USD 10,000 | Non-Compliant |
| 2 | Cloud | 500 | PCI | USD 5,000 | Non-Compliant |
| 3 | SQL Database | 10000 | PHI | USD 100,000 | Non-Compliant |

TABLE 2-continued

| Sr. No. | Location of data | No. of Records | Type of Data | Value of Data | Compliance Factor |
|---|---|---|---|---|---|
| 4 | Mobile Devices | 100 | PII | USD 1,000 | Non-Compliant |

The artificial intelligence module (60) performs quantitative risk analysis of the identified confidential data and calculates information and cyber risk to assess potential liability or insurance value based on predefined parameters and volume and value of data. The predefined parameters that need to be considered are completeness of the record, duration of exposure of information, probable area of exposure and actual area of exposure, compliance risk associated with the exposure, and like, but not limited thereto. An important question that needs to be considered is can a false identity be established using the stolen information and complementing the said information with information available from the public domain. Duration of exposure of information is also a significant factor. For example, the private information that is widely available in the public domain for a long time, carries a lower value than that available for a short time. Similarly, if the value of the information can be used across a number of geographical locations, then its value will be higher. For domains or countries that enforce strict privacy laws, the value of the information will be higher.

The method (200) determines the potential liability or insurance value based on volume and value of data and compliance with corporate policies for data protection and potential areas of non-compliance.

It should be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code. It should be apparent that one of ordinary skill in the art would be able to design software and control hardware to implement the aspects based on the description herein.

Advantages of the Invention

1. The system (100) estimates the information and cyber risk by calculating value of data and by utilizing data valuations and number of records identified on the network (20) for generic data. Additional estimated valuation of data will be available as per the user specifications and number of records.
2. The system (100) also extracts from the data identified above that is in non-compliance of enterprise or corporate policies for generic data. Additional non-compliance area can be identified as per the enterprise or corporate specifications.
3. The system (100) is capable of identifying the data at rest stored in various document formats such as word, excel, csv, pdf, power point, database file formats, and compressed file formats such as rar, 7z and zip, etc.
4. Numerous insurance companies across the world have begun selling cyber insurance to organizations without streamlined tools to measure the risk. The output identified by the system (100) and the method (200), could be deployed as part of a streamlined risk assessment by an insurance company to facilitate their calculations for the cyber insurance premiums.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the present invention.

I claim:

1. A system for confidential data and quantitative risk analysis in networks comprising:

a plurality of client devices, each of the plurality of client devices having an input device, an output device, memory, a processor with a plurality of applications configured thereon;

a communication network operably coupled with each of the plurality of client devices for providing communication links thereto;

a communication unit configured to communicate with each of the plurality of client devices through the communication network, the communication unit having:

a memory unit for storing a plurality of processing instructions for an operation of the communication unit, a processor unit in communication with the memory unit, the processor configured to execute the plurality of processing instructions stored in the memory unit, an input unit for providing inputs to the communication unit, an output unit for providing output of the communication unit, a crawler module having a set of instructions for scanning and searching confidential data including PII (personally identifiable information), PHI (personal/protected health information), PCI (payment card industry), business confidential data and customized general data stored at each of the plurality of client devices in multiple file formats, a data repository for storing the confidential data received from the crawler module, an artificial intelligence module configured to analyze the confidential data stored in the data repository and categorizing the confidential data into data classes, and a reporting module reporting the categorized confidential data on the output unit;

wherein the artificial intelligence module is configured to:

define and manage a set of rules for analyzing and categorizing the confidential data, monitor and manage operation of the set of rules through an active monitoring service, learn from metadata associated with the confidential data to identify additional related data stored on the plurality of client devices on the communications network, wherein the learning includes identifying metadata in PII, PHI, PCI, business confidential data, and regulatory data, and actively learning to identify additional related data based on the identified metadata, generate at least one of a new rule or modification to at least one of the set of rules in response to the identified additional related data, wherein the system recommends at least one of a new rule or modification based on the learning from the metadata, perform quantitative risk analysis of the identified confidential data, and calculate information risk and cyber risk associated with the confidential data to assess one or more of a liability or insurance value based on one or more predefined parameters, a volume of data, a value of data, a compliance with corporate policies for data protection, and an area of non-compliance, wherein said calculation includes at least completeness of the record, duration of exposure, probable and actual area of exposure, and a determination, by the artificial intelligence module, of whether a false identity can be established using confidential information complemented by publicly available information, wherein the quantitative risk calculation reflects the outcome of said determination, and wherein said calculation further includes a geographical location associated with storage, transmission, or exposure of the confidential data and wherein said calculating comprises executing a rule to increase at least one of the liability or insurance value assigned to the confidential data when the confidential data is accessible across multiple geographical locations or in domains or countries having stricter privacy law.

2. The system as claimed in claim 1, wherein the crawler module scans the confidential data stored in the multiple file formats including plain text file formats, compressed file formats, raster/image file formats and customized file formats.

3. The system as claimed in claim 1, wherein an end point location extractor is coupled to the crawler module for providing location and configuration of the plurality of the client devices.

4. The system as claimed in claim 1, wherein the data repository is a database selected from a SQL (Structured Query Language) database, a No-SQL Database and a key-value pair database.

5. The system as claimed in claim 1, wherein the artificial intelligence module is configured to define and manage the set of rules, the set of rules comprising a set of knowledge rules for confirming confidential and non-confidential data in the data repository.

6. The system as claimed in claim 1, wherein the artificial intelligence module is configured to actively learn from the metadata identified in PII, PHI, PCI, business confidential, and regulatory data, and wherein the artificial intelligence module is configured to recommend new rules or modify an existing rule in response to the learned metadata.

7. A method for confidential data and quantitative risk analysis in networks comprising steps of:

searching confidential data including PII (personally identifiable information), PHI (personal/protected health information), PCI (payment card industry), business confidential data and customized general data stored on a plurality of client devices by a crawler module of a communication unit via a communication network;

storing the confidential data in a data repository of the communication unit;

analyzing the confidential data stored in the data repository by an artificial intelligence module of the communication unit;

categorizing the confidential data into data classes, by the artificial intelligence module of the communication unit, based on a defined set of knowledge rules;

managing the defined set of knowledge rules by the artificial intelligence module of the communication unit;

monitoring and managing operation of the set of knowledge rules through an active monitoring service;

learning, by the artificial intelligence module of the communication unit, additional related data stored on the plurality of client devices on the communication network identified from metadata associated with the confidential data, wherein the learning includes identifying metadata in PII, PHI, PCI, business confidential data, and regulatory data, and actively learning to identify additional related data based on the identified metadata;

generating, by the artificial intelligence module of the communication unit, at least one of a new rule or a modification to at least one of the defined set of knowledge rules in response to the learned additional related data, wherein the artificial intelligence module recommends at least one of a new rule or modification based on the learning from the metadata;

calculating, by the artificial intelligence module, information risk and cyber risk to assess a liability or an insurance value based on a volume of data, a value of data, a compliance with corporate policies for data protection, and an area of non-compliance, wherein said calculating includes at least completeness of the record, duration of exposure, probable and actual area of exposure, and a determination, by the artificial intelligence module, of whether a false identity can be established using confidential data complemented by publicly available information, wherein the quantitative risk calculation reflects the outcome of said determination, and wherein said calculating further includes a geographical location associated with storage, transmission, or exposure of the confidential data and wherein said calculating comprises executing a rule to increase at least one of the liability or insurance value assigned to the confidential data increases when the confidential data is accessible across multiple geographical locations or in domains or countries having stricter privacy laws; and reporting categorized confidential data by a reporting module of the communication unit.

8. The method as claimed in claim 7, wherein the artificial intelligence module is configured to define and manage the set of knowledge rules for confirming confidential and non-confidential data in the data repository.

9. The method as claimed in claim 7, wherein the artificial intelligence module is configured to actively learn from the metadata identified in PII, PHI, PCI, and regulatory data, and wherein the artificial intelligence module is configured to generate the new rules or modify the at least one of set of knowledge rules in response to the identified metadata.

10. The method as claimed in claim 7, the crawler module scans the confidential data stored in the multiple file formats including plain text file formats, compressed file formats, raster/image file formats and customized file formats.

* * * * *